United States Patent [19]

Trowbridge

[11] 3,742,710
[45] July 3, 1973

[54] TERMINATION FLUIDS FOR SOLID STOP-START PROPELLANT ROCKET MOTORS
[75] Inventor: John C. Trowbridge, Saratoga, Calif.
[73] Assignee: United Aircraft Corporation, East Hartford, Conn.
[22] Filed: Aug. 15, 1969
[21] Appl. No.: 850,618

[52] U.S. Cl. ................................ 60/220, 60/219
[51] Int. Cl. ......................................... C06d 5/10
[58] Field of Search ............... 60/218, 219, 220; 102/100, 101

[56] References Cited
UNITED STATES PATENTS
2,949,006  8/1960  Halliday ....................... 60/219 X
3,354,647  11/1967  Aycock ........................... 60/220

Primary Examiner—Benjamin R. Padgett
Attorney—Steven F. Stone

[57] ABSTRACT

Thrust termination fluids for extinguishing a solid propellant rocket motor have dissolved therein a solid oxidizing agent which is deposited on the surface of the extinguished propellant to facilitate reignition of the motor. Suitable termination fluids include; water, alcohols, water-ammonia solutions and hydrazine-ammonia solutions and water-alcohol solutions. Suitable oxidizers to be dissolved in the fluids include nitrate and perchlorate oxidizing salts.

4 Claims, No Drawings

TERMINATION FLUIDS FOR SOLID STOP-START PROPELLANT ROCKET MOTORS

BACKGROUND OF THE INVENTION

Solid propellant rocket motors are comparatively simple and inexpensive but inherently are difficult to extinguish once they have been ignited. Thus, for missions in which restart capability has been required, it has heretofore been necessary to use either liquid propellant or hybrid propellant rocket motors. To overcome this defect, various attempts have been made to provide for extinguishment of solid propellants and one approach has been to inject into the burning rocket motor a termination fluid, having relatively high heat capacity and heat of vaporization, in quantities sufficient to quench the combustion process. Various fluids have been used including water and various alcohols. If a restart capability is not required, these fluids have been found to be satisfactory provided that the mission requirements are not so stringent as to require storage at temperatures below which the fluids become solid. Tactical missiles are generally required to have a storage temperature of between −65° F and +165° F and obviously water would not be satisfactory under these conditions. Further when restart capability is required, I have observed that the propellants tend to be more difficult to ignite after they have been once extinguished than they were for the initial ignition. While this difficulty can be overcome by the use of a larger igniter, it is desirable to keep the weight of the igniter at a minimum level commensurate with consistent ignition so as not to compromise the effective payload of the missile system.

According to this invention, a solid oxidizer material is dissolved in the extinguishment fluid which oxidizer is then deposited upon the surface of the extinguished propellant grain to facilitate reignition of the solid propellant.

It is accordingly an object of this invention to deposit a solid oxidizer on the extinguished surface of a solid propellant grain.

It is another object of this invention to provide an extinguishment fluid containing a dissolved solid oxidizer.

It is another object of this invention to provide an extinguishment fluid which remains liquid at temperatures of about −65° F.

These and other objects of this invention will be readily apparent from the following description.

DESCRIPTION OF THE INVENTION

A typical solid propellant rocket motor system adapted for stop-start operation according to this invention would employ a solid propellant grain mounted within a combustion chamber provided with a thrust producing nozzle. The system would also contain a source of the quenching fluid and means for introducing sufficient amount of quenching fluid into the combustion chamber in a fairly short period of time to extinguish the propellant. Such a system would also carry on board at least one igniter to permit reignition. If more than one extinguishment and restart is required, adequate fluid delivery means therefor and additional igniters would also be required. In the conventional system the termination fluid could consist of water, aqueous solution of ammonia, aqueous solution of hydrazine, ethyl alcohol, methyl alcohol, propyl alcohols, glycerin, ethylene glycol or other fluids having a relatively high heat capacity and heat of vaporization and which are not hypergolic or extremely reactive with the solid propellant material itself. As noted above, one-shot thrust termination systems using combustion terminating fluids are known to the art as exemplified by U.S. Pat. No. 2,949,009. One commonly used form of solid propellant consists of a particulate oxidizing agent such as ammonium perchlorate or ammonium nitrate or other oxidizing salt which is dispersed in a combustion supporting fuel matrix which quite commonly is in the form of a polymeric material. Such solid propellants also normally include dispersions of fuel materials such as aluminum and combustion catalysts such as ferrocene, ferrocene derivatives and iron oxide for example. When such propellants are extinguished as described above, I have determined that the extinguishing fluid tends to leach the oxidizer component from the extinguished surface in the process of extinguishment. Thus, in addition to having some char layer, the surface which must subsequently be reignited has less oxidizer than was originally designed into the propellant and upon which the igniter characteristics were initially determined. This deficiency in oxidizer makes subsequent reignition more difficult since the initial reignition combustion must be supported by the exhaust products of the igniter, rather than by the oxidizer-fuel blend of the propellant itself. According to this invention, therefore, it is proposed that the combustion extinguishing fluids have dissolved therein an amount of solid oxidizer such that the solid oxidizer may be deposited upon the extinguished surface of the propellant to thereby facilitate subsequent reignition.

In most cases, it would be desirable to use the same oxidizing agent as is incorporated in the solid propellant itself, but this, of course, is not required. The upper limit of the amount of oxidizer incorporated in the termination fluid is determined by the maximum solubility of the oxidizer in the particular fluid. However, it is generally not necessary or even desirable to include large amounts of oxidizer since only a relatively small amount is required to enhance the reignition capability of the solid propellant grain. While larger amounts can be employed, it has been found that between 4 and 6 percent by weight of oxidizer in the extinguishing fluid is more than adequate to replace the oxidizer leached from the surface of the propellant grain.

In certain mission requirements, the materials must be capable of withstanding environmental conditions ranging from −65° F to +165° F. When storage is required at these conditions, some of the aforementioned termination fluids would not be suitable since the freezing point of the fluids is above −65° F or the vapor pressure of the fluids at +165° F is sufficiently high as to present storage problems. When −65° F conditions are required, an upper limitation on the amount of the oxidizer that may be maintained in solution arises due to the fact that the solubility of the oxidizing salt decreases as the temperature is decreased.

Materials usable within the +165°F to −65°F range include ammonia-water solutions, alcohols such as methanol, ethanol, n-propanol, isopropanol, n-butyl alcohol, isobutyl alcohol and secondary butyl alcohol, ethylene glycol and glycerin as well as certain aqueous solution of water in the aforementioned alcohols. The addition of the solid oxidizing agent also tends to somewhat reduce the freezing point of the solutions. However, the upper limit of solubility of the oxidizer may be limited by the −65° F temperature range. Representative examples of suitable fluids and the range of oxidizing agent that may be used at −65° F are set forth in Table I.

TABLE I
SOLID PROPELLANT TERMINATION FLUIDS

| Fluid (% by Weight) | Maximum Oxidizer Content (% by Weight) |
|---|---|
| 28% $NH_3$ in $H_2O$ | 22.9% $NH_4NO_3$ |
| 28% $NH_3$ in $H_2O$ | 15.0% $NH_4ClO_4$ |
| 50% $CH_3OH$ in $H_2O$ | 5.7% $NH_4NO_3$ |
| 50% $CH_3OH$ in $H_2O$ | 5.8% $NH_4ClO_4$ |
| 75% $CH_3OH$ in $H_2O$ | 5.0% $NH_4NO_3$ |
| 100% $CH_3OH$ | 4.4% $NH_4NO_3$ |

Typical solid propellant formulations which may be terminated by the above described fluids and subsequently reignited are exemplied by those set forth in Table II.

TABLE II
SOLID PROPELLANT FORMULATIONS

| | Percent by Weight | | | |
|---|---|---|---|---|
| Component | Prop. 1 (percent PBAN) | Prop. 2 (percent HTPB) | Prop. 3 (percent CTIB) | Prop. 4 (percent CTPB) |
| Binder | 13 | 8 | 9 | 9 |
| Plasticizer (DOA) | 3 | 8 | 7 | 7 |
| Aluminum | 16 | 16 | 16 | 16 |
| Ammonium Perchlorate | 68 | 68 | 68 | 68 |

PBAN — Epoxy cured polybutadiene-acrylonitrile-acrylic acid terpolymer.
HTPB — Isocyanate cured hydroxyterminated polybutadiene.
CTIB — Aziridinyl cured carboxyterminated polyisobutylene.
CTPB — Aziridinyl cured carboxyterminated polybutadiene.
DOA — Dioctyl adipate.

The examples set forth in Tables I and II are considered to be exemplary rather than limiting of the inventions and various other combinations of fluids, oxidizing agents, and propellant formulations will be readily apparent to workers skilled in the art and may be employed without departing from the scope of this invention.

I claim:

1. In a method for the stop-start operation of a solid propellant gas generator which comprises igniting the surface of a solid propellant grain contained within a combustion chamber provided with a port from which combustion products may escape, quenching the combustion process by injecting a fluid into the combustion chamber and reigniting the extinguished surface of said solid propellant grain; the improvement which comprises depositing a solid oxidizer selected from the group consisting of ammonium and alkali metal nitrates and perchlorates on the surface of said extinguished grain prior to reignition.

2. In a method for the stop-start operation of a solid propellant gas generator which comprises igniting the surface of a solid propellant grain contained within a combustion chamber provided with a port from which combustion products may escape, quenching the combustion process by injecting a fluid into the combustion chamber and reigniting the extinguished surface of said solid propellant grain; the improvement wherein said fluid has dissolved therein an amount of a solid oxidizing agent selected from the group consisting of ammonium and alkali metal nitrates and perchlorates.

3. The process of claim 2 wherein said extinguishing fluid has a freezing point below −65° F.

4. The process of claim 3 wherein said fluid is selected from the group consisting of methanol, ethanol, n-propanol, isopropanol, n-butyl alcohol, isobutyl alcohol, sec butyl alcohol, ethylene glycol, glycerin, aqueous solution of the aforementioned alcohols, and aqueous solutions of $NH_3$.

* * * * *